United States Patent [19]

Kane

[11] Patent Number: 4,797,896
[45] Date of Patent: Jan. 10, 1989

[54] SOLID STATE OPTICAL RING RESONATOR AND LASER USING SAME

[75] Inventor: Thomas J. Kane, Palo Alto, Calif.

[73] Assignee: Light Wave Electronics Co., Mountain View, Calif.

[21] Appl. No.: 75,565

[22] Filed: Jul. 20, 1987

Related U.S. Application Data

[63] Continuation-in-part of Ser. No. 46,546, May 6, 1987, Pat. No. 4,749,842.

[51] Int. Cl.$^4$ ............................................. H01S 3/083
[52] U.S. Cl. ...................................... 372/94; 372/66; 372/37; 372/34
[58] Field of Search .................... 372/66, 34, 41, 37, 372/39, 92, 94

[56] References Cited

U.S. PATENT DOCUMENTS

| | | | |
|---|---|---|---|
| 4,293,223 | 10/1981 | Seaton | 372/98 |
| 4,387,462 | 6/1983 | Markus | 372/33 |
| 4,578,793 | 3/1986 | Kane et al. | 372/94 |
| 4,630,278 | 12/1986 | Auffret et al. | 372/32 |
| 4,653,056 | 3/1987 | Baer et al. | 372/71 |

Primary Examiner—Leon Scott, Jr.
Attorney, Agent, or Firm—Harry E. Aine

[57] ABSTRACT

In a monolithic optical ring resonator an optically transparent member is faceted so that the input and output beams of the resonator are coupled through a common facet at widely divergent angles in excess of 45 degrees and preferably 90 degrees. In this manner the resonator is miniaturized. The ring resonator member is contained in an evacuated housing to eliminate time-varying convective thermal detuning effects. The ring resonator is coupled in heat-exchanging relation with heating and temperature sensing film resistors deposited upon a major face of a substrate member.

15 Claims, 1 Drawing Sheet

U.S. Patent    Jan. 10, 1989    4,797,896
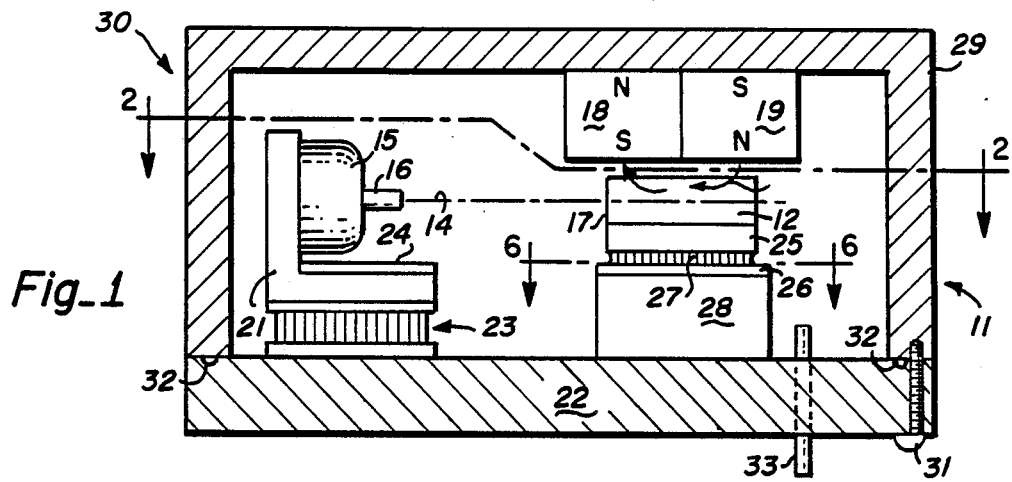
Fig_1
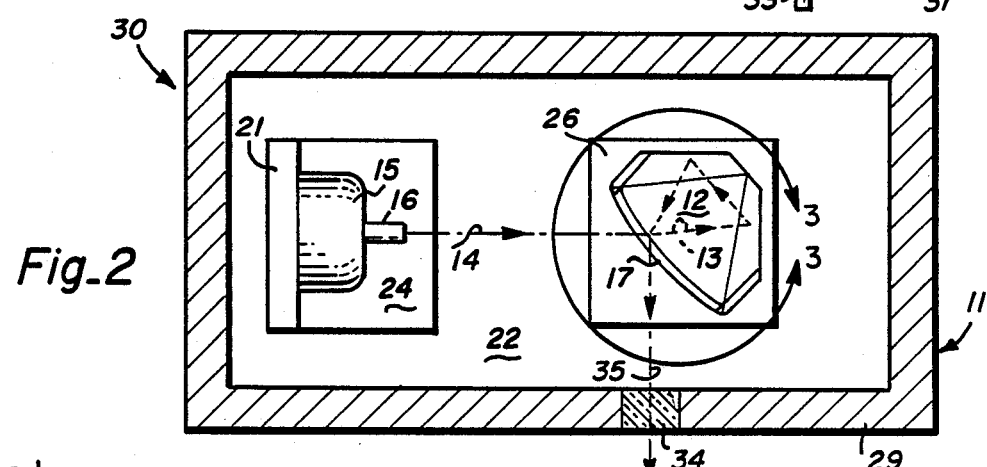
Fig_2
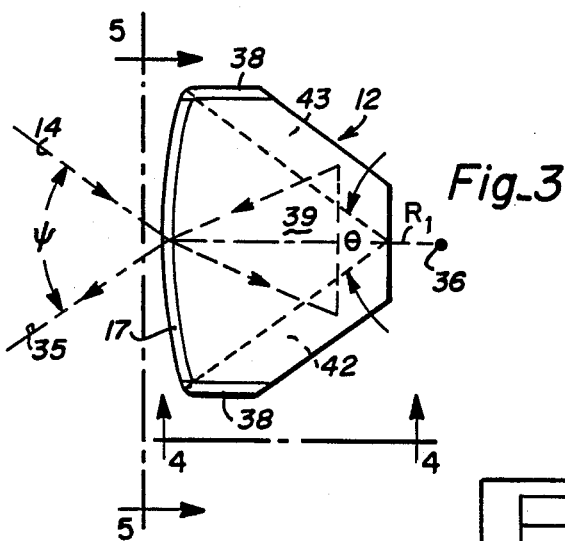
Fig_3
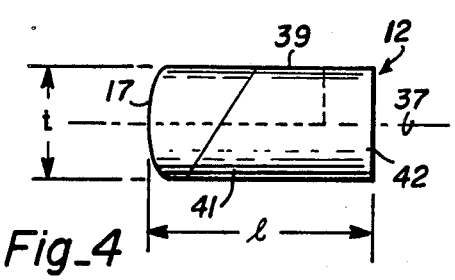
Fig_4
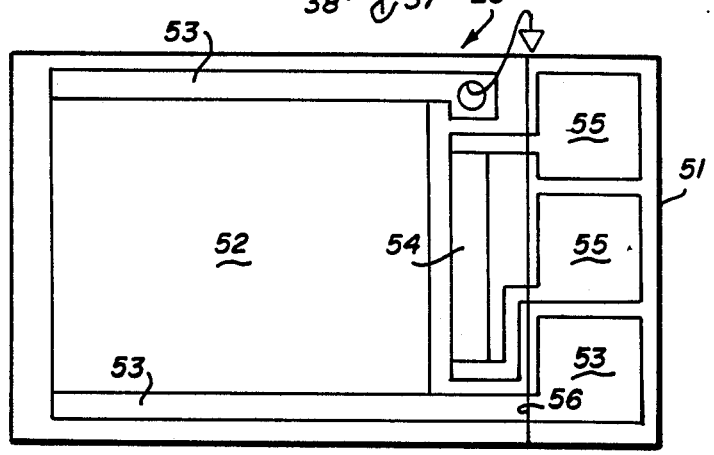
Fig_5
Fig_6

SOLID STATE OPTICAL RING RESONATOR AND LASER USING SAME

RELATED CASES

The present invention is a continuation-in-part invention of U.S. application Ser. No. 046,546 filed 6 May 1987 and now issued as U.S. Pat. No. 4,749,842 on June 7, 1988.

BACKGROUND OF THE INVENTION

The present invention relates in general to a solid state optical resonator and to a unidirectional ring laser oscillator using same.

DESCRIPTION OF THE PRIOR ART

Heretofore, monolithic, non-planar ring laser oscillators have been made. The ring oscillator included a monolithic block of lasant material, such as Nd:YAG crystal, on which four refecting facets (one spherical input-output facet with dielectric coatings and three totally internally reflective facets) are polished to form a non-planar optical ring resonator.

The ring resonator was immersed in a magnetic field which, by means of a Faraday rotation effect and intrinsic polarization caused the loss for oppositely travelling optical waves within the resonator to be substantially different, thereby supporting oscillation only in the low-loss direction around the ring. When end pumped, the ring oscillator eliminates the effects of spatial hole burning, is insensitive to optical feedback, and operates in a single axial mode. The resultant oscillator's frequency stability makes it an attractive laser source for laser radar, coherent communications, spectroscopy, non-linear optics and inertial rotation sensing. Such a laser ring oscillator is disclosed in U.S. Pat. No. 4,578,793, issued 25 March 1986, the disclosure of which is hereby incorporated by reference in its entirety.

One of the problems associated with the aforecited ring laser was that the optical pumping beam and the laser output beam were angularly spaced with respect to each other by only a relatively small angle, such as 10 to 18 degrees. The problem with this is that when an attempt is made to shrink the overall dimensions of the laser, the lens used to focus the pumping beam into the ring resonator tends to interfere with the output beam. Also, with such small angular spacings, the polarization effects within the ring resonator are relatively small tending to minimize the differential attenuation of the oppositely travelling resonant optical waves.

Moreover, the optical elements of the aforedescribed ring laser were exposed to the atmosphere which produced undesired time-varying thermal effects due to thermal convective transfer. These time-varying thermal effects produced undesired fluctuations in the frequency of the output beam.

It is desired to obtain an improved ring laser of reduced size and improved frequency stability.

SUMMARY OF THE PRESENT INVENTION

The principal object of the present invention is the provision of an improved optical ring resonator and ring laser using same.

In one feature of the present invention, a member of optically transparent material forming the solid state ring resonator is faceted so as to internally reflect the resonant optical energy thereof around in a closed ray path with one of the internally reflective facets being arranged relative to the others so as to form both an input and output coupler for coupling optical energy into and out of the ring resonator with the input beam being angularly separated relative to the output beam by an angle greater than 45 degrees and preferably 90 degrees, whereby the overall dimensions of the laser can be reduced without interference between the input and output beams.

In another feature of the present invention, the member of optically transparent material is a lasant material and the input beam is a beam of optically pumping radiation for end pumping of the laser ring resonator.

In another feature of the present invention, the faceted optical ring resonator member is housed within an evacuated envelope for eliminating convective thermal transfer to its surrounds and for minimizing contamination of its internally reflective facets, thereby improving the frequency stability of its output radiation.

In another feature of the present invention, the faceted optical ring resonator member is disposed in heat-exchanging relation with heating and temperature sensing films deposited upon a major face of a substrate member facing the ring resonator member to obtain improved thermal control of the resonator while simplifying the manufacture of the thermally controlled ring resonator.

Other features and advantages of the present invention will become apparent upon a perusal of the following specification taken in connection with the accompanying drawings wherein:

BRIEF DESCRIPTION OF THE DRAWINGS

FIG. 1 is a longitudinal sectional view of a laser oscillator of the present invention, FIG. 2 is a sectional view of the structure of FIG. 1 taken along line 2—2 in the direction of the arrows, FIG. 3 is an enlarged plan view of the ring resonator portion of the structure of FIG. 2 delineated by line 3—3, FIG. 4 is a side elevational view of the structure of FIG. 3 taken along line 4—4 in the direction of the arrows, FIG. 5 is an end view of the structure of FIG. 3 taken along line 5—5 in the direction of the arrows, and FIG. 6 is a plan view of the heater structure of FIG. 1 taken along lines 6—6 in the direction of the arrows.

DESCRIPTION OF THE PREFERRED EMBODIMENTS

Referring now to FIGS. 1 and 2, there is shown the ring laser oscillator 11 of the present invention. The ring laser oscillator 11 includes a crystal 12 of lasant magneto-optic material, such as Nd:YAG, faceted for internal reflection of a beam of lasant radiation around a closed path 13 to define a ring resonator, more fully described below with regard to FIGS. 3-5.

The crystal 12 is disposed to receive a beam 14 of optical pumping radiation generated by a laser diode 15, such as model F4048 commercially available from Toshiba, for end pumping of the crystal 12. The output beam 14 of the laser diode 15 is focused by a SELFOC gradient refractive index lens 16 onto an input-output face 17 of the crystal 12. The lens is mounted to and carried from the window of the laser diode 15 by means of an optical cement.

A pair of permanent magnets 18 and 19 are positioned overlaying the crystal 12 and are polarized ro produce a strong component of unidirectional magnetic field H, as of 5KG, in the crystal 12 and parallel to the direction of the optical beam 14 for producing the Faraday rotation effect in the crystal 12. Suitable magnets 18 and 19 are of Nd:iron:boron composition commercially available as type Neigt #28 from I.G. Technology Corporation of Volpariso, Ind.

The laser diode 15 is carried from an L-shaped thermally conductive bracket 21, as of copper, which in-turn is supported from a base plate structure 22, as of copper, via a thermoelectric cooler 23. A thermistor 24 is mounted on the L-shaped bracket 21 for sensing the temperature of the laser diode 15.

The lasant crystal 12 is mounted to a major face of a thermally conductive block 25, as of copper, via the intermediary of an optical U.V. curing cement. The block 25 is mounted to a major face of a heater 26 via the intermediary of a relatively thick layer 27 of relatively low melting point solder. A suitable solder is a thermally fusible alloy 52% by weight indium and 48% by weight tin having a melting point of 118° C. commercially available as Indalloy #1E from Indium Corporation of America, Utica, New York. In a typical example, the solder layer 27 has a thickness of 0.5 mm.

The heater 26 is carried from a major face of a block 28 of thermally insulative material, such as fused silica, which in-turn is bonded to the base plate 22 via U.V. curing optical cement. U.V. optical cement also bonds the heater 26 to the block 28.

A cup-shaped cap 29 of a thermally conductive material, such as aluminum or copper, is hermetically sealed over the base plate 22. The cap 29 is held to the base plate 22 by a plurality of screws 31 and the hermetic seal is made by means of a compressible o-ring 32, as of rubber, compressed between the lip of the cup 29 and the base plate 22.

The base plate 22 and cap 29 define an evacuable enclosure 30 housing the ring laser 11. An electrical feedthrough 33 passes electric conductors through the base plate 22 into the enclosure for making electrical connections to the various electrical elements therein.

An optically transmissive window 34 is provided in the sidewall of the cup 29 through which the output optical beam 35 of the laser passes to the surrounds. The vacuum envelope 30 is evacuated and backfilled with dry nitrogen or, alternatively, in a preferred embodiment, maintained under vacuum, i.e., $1 \times 10^{-3}$ torr. The latter is preferred as it eliminates undesired convective heat exchange effects tending to thermally destabilize the frequency of the output beam, i.e., produce time-varying thermal detuning effects. In either case, the optical faces are maintained free of contamination by the clean environment within the envelope 30.

Referring now to FIGS. 3-5, the ring resonator 12 is shown in greater detail. The crystal 12 includes a spherical input face 17 having a radius of curvature $R_1$ as of 16 to 160 mm, with a center 36 lying in the midplane 37 but outside of the crystal. The crystal is cut from cylindrical rod stock, thereby defining minor cylindrical sidewall portions 38.

The crystal 12 has flat and parallel top and bottom major facets 39 and 41. Rearwardly converging minor side facets 42 and 43 also tilt inwardly from top to bottom for internally reflecting the incident beam to the top facet 39 and thence, after internal reflection from the top facet, back into the midplane 37 and out the input-output facet 17 as output beam 35.

By orienting the reflective facets 17, 42, 39, and 43 so as to angularly separate the axes of the input and output beams 14 and 35 by a substantial angle $\psi$, as of greater than 45 degrees, the size and thus the cost of the optical ring resonator 12 is substantially reduced in contrast to the aforecited prior art resonator wherein a was between 10 degrees and 18 degrees. Also, in the ring resonator 12 of the present invention the area of the unused minor side facets 38 is less than the area of the minor convergent side facets 42 and 43. In the limit, the area of the minor side facets 38 is reduced to zero.

In a typical physical realization, the crystal 12 is of Nd:YAG material cut from a rod of diameter 0.250". The side facets 42 and 43 converge with an included angle $\theta$ of 37°21'. These facets incline inwardly from top to bottom by an angle of 60°19' from the vertical. The crystal 12 has a thickness t of 0.081" and a length of 0.189". The input beam 14 and output beam 35 are angularly separated by an angle $\psi$ of 90°. The top facet 39, and side facets 42 and 43, are polished so that with air or vacuum as the surrounding material, the beam 14 will be totally internally reflected. The input face 17 is coated with multiple dielectric layers, in the conventional manner, to provide high transmission, i.e., 90% of the pump radiation at 0.81 μm and high reflectivity, i.e., 98% at the wavelength of 1.06 μm of the lasant transition. As an alternative, the crystal 12 is made of Nd:GGG material in which case $\psi = 93°$. The base plate 22 and cup 29 when joined together formed a housing 30 having outside dimensions of $1.75" \times 1.25" \times 1.25"$.

The crystal 12 is mounted to the copper block 25 as of 0.070" thickness via U.V. curing optical cement. The copper block 25 is soldered to the upper face of the heating element 26.

The heating element 26 is shown in greater detail in FIG. 6. The heating element 26 includes an alumina ceramic substrate wafer 51, as of 0.025" thick by 0.250" wide and 0.430" long. An electrical heating thick film resistor element 52, as of 0.190" by 0.250" is deposited on the surface of the substrate 51. Heater metallization traces 53 make electrical connection to opposite sides of the heating element 52. A thick film resistor thermistor metallization strip 54 is deposited on the substrate adjacent the heater 52 for sensing the temperature of the substrate. The thermistor element 54 has a temperature dependent value of resistance. Metal traces 55 make electrical connections to opposite sides of the thermistor element 54. An electrical passivation layer 56, as of glass, overlays the elements 52 and 54. The heater 26 heats the crystal 12 to an elevated operating temperature of about 45.5° C.

The crystal 12 is aligned by heating the heating element to a sufficient temperature, i.e., near 130° C., to melt the solder 27. While the solder 27 is soft, the crystal 12 is aligned with the input pump beam 14 and output window 34. After the correct alignment is obtained, the solder 27 is allowed to solidify by the solder, as aforedescribed, the solder does not cooling. With so that the change its dimensions, i.e., shrink, upon cooling alignment remains fixed.

Also, if the optical alignment needs to be readjusted, this is readily obtained by merely raising the temperature of the heater to soften the solder 27 permitting readjustment of the alignment. The readjusted alignment is preserved by cooling of the heater and solidification of the solder 27.

In a typical example of the present invention, the laser diode pump produces a pump beam of 30 milliwatts (mW) at 0.81 μm wavelength with 200 mW of d.c. input power. The output beam 34 has 6 mW of power at 1.06 μm. The output beam 34 is a single TEM$_{00}$ mode of single frequency with a frequency stability of 5 KH$_z$/sec. frequency excursions.

The advantages of the laser of the present invention include its miniature size allowed in part by the wide divergence of its input and output optical beams; its improved frequency stability due to elimination of convective heat transfer effects from the crystal 12; and its simplified heater and temperature sensing structure allowing improved temperature control and reduced fabrication costs.

What is claimed is:

1. In a solid state non-planar optical ring resonator:
   a member of optically transparent monolithic lasant material;
   reflecting means defined by a plurality of facets of said member of material for reflecting optical energy internal to said member around in a non-planar closed ray path within said member to define an optical ring resonator;
   coupler means at least partially defined by a coupler one of said facets of said reflecting means for coupling optical energy into and out of said ring resonator and through said coupler facet along divergent input and output ray paths; and
   said facets of said reflecting means being oriented with respect to each other such that a ray coupled by said coupler means into said resonator is coupled out of said resonator, after traversing at least one trip around said closed ray path, along an output ray path which is angularly separate from said input ray path by an angle ψ in excess of 45 degrees.

2. The ring resonator of claim 1 wherein the angle ψ is approximately 90 degrees.

3. The resonator of claim 2 wherein said member is a member of lasant material selected from the group consisting of Nd:YAG and Nd:GGG and said member having a top planar facet, a pair of planar converging opposed side facets, and said concave coupler side facet; and
   said opposed side facets having their planes intersecting a normal to the plane of said top facet by an angle of approximately 60°19' and said opposed side facet planes converging with an included angle of approximately 37°21'.

4. The resonator of claim 3 wherein said concave coupler facet is approximately spherical having a radius of curvature falling within the range of 16 millimeters to 160 millimeters.

5. The resonator of claim 3 wherein said top and side facets are polished, free of coatings, and immersed in a fluid medium having a refractive index sufficiently different than that of said member so as to provide a totally internal reflection of the optical energy travelling along said closed ray path of said optical resonator.

6. The resonator of claim 1 wherein said coupler facet defining said coupler means is concave facing into said member; and
   an optical coating on said facet for making said coupler facet predominantly transmissive to input optical energy travelling on said input ray path and of a first wavelength and predominantly reflective to output optical energy travelling out through said coupler facet on said output ray path and at a second wave length.

7. The resonator of claim 1 including magnet means for applying a magnetic field to said member for producing a Faraday rotation effect therein to preferentially attenuate optical wave energy travelling in a direction counter to said output optical energy within said resonator.

8. The resonator of claim 1 including optical pumping means for optically pumping said member with optical pumping radiation inducted into said member through said coupler facet and along said input ray path.

9. The resonator of claim 8 wherein said optical pumping radiation has a wavelength of approximately 0.81 μm and the output radiation has a wavelength of approximately 1.06 μm.

10. In a ring laser:
    a member of optically transparent monolithic lasant material;
    reflecting means defined by a plurality of facets of said member of lasant material for reflecting optical energy internal to said member around in a non-planar closed ray path within said member to define an optical ring resonator;
    coupler means at least partially defined by a coupler one of said facets of said reflecting means for coupling optical energy into and out of said ring resonator and through said coupler facet along divergent input and output ray paths;
    said facets of said reflecting means being oriented with respect to each other such that a ray coupled by said coupler means into said resonator is coupled out of said resonator, after traversing at least one trip around said closed ray path, along an output ray path which is angularly separated from said input ray path by an angle ψ in excess of 45 degrees;
    magnet means for applying a magnetic field to said member for producing a Faraday rotation effect therein to preferentially attenuate optical wave energy travelling in a direction counter to said output optical energy within said resonator; and
    optical pumping means for optically pumping said member of lasant material with optical pumping radiation inducted into said member and through said coupler facet and along said input ray path.

11. In a ring laser of claim 10 including housing means for enveloping said reflecting, coupler, magnet and optical pumping means; and
    said housing means being gas-tight and evacuated to subatmospheric pressure for inhibiting contamination of said reflecting means and for inhibiting convective thermal losses within said envelope.

12. The ring laser of claim 11 wherein said housing includes an optical transparent window portion through which output radiation passes to the surrounds of said housing means.

13. The laser of claim 10 including:
    heater means coupled in heat-exchanging relation with said member of lasant material for elevating the temperature of said lasant material;
    thermal sensing means coupled in heat-exchanging relation with said member of optically transparent lasant material for sensing the elevated temperature thereof; and
    said heater means and said thermal sensing means comprising films of electrically resistive material carried upon the major face of a substrate member facing said member of lasant material and said thermal sensing film having a resistance which is temperature dependent.

14. The ring laser of claim 13 including:

an electrically insulative film overlaying said thermal sensing and heating films, and a block of thermally conductive material interposed between said electrically insulative film and said member of lasant material.

15. The laser resonator comprising:

a monolithic prism of lasant material;

said prism having top and bottom major faces and minor side faces;

said minor side faces including a first pair of convergent facets on opposite sides of said prism, a front facet facing the divergent ends of said convergent facets, and a second pair of opposed side facets interposed between respective ones of said convergent facets and said front facet;

said facets being angularly disposed relative to each other for defining a non-planar internal lasing ray path through said laser material around in a closed path to define a ring laser; and said second pair of opposed side facets having an area less than the area of said convergent side facets, whereby the volume of said laser material is reduced.

* * * * *